United States Patent [19]
Brown

[11] Patent Number: 5,904,302
[45] Date of Patent: May 18, 1999

[54] AIRCRAFT FUELING NOZZLE

[76] Inventor: Albert W. Brown, 1207 Pembroke, Newport Beach, Calif. 92660

[21] Appl. No.: 08/823,023

[22] Filed: Mar. 21, 1997

[51] Int. Cl.$^6$ ............................... B05B 1/30; B65B 1/04; F16K 51/00
[52] U.S. Cl. .......................... 239/586; 239/569; 239/578; 141/384; 141/386; 137/614.06; 251/143; 251/149.9
[58] Field of Search ..................... 239/569, 578, 239/579, 583, 586; 141/383, 384, 386; 251/149.9, 143; 137/540, 614.03, 614.05, 614.06

[56] References Cited

U.S. PATENT DOCUMENTS

| | | | |
|---|---|---|---|
| 2,679,407 | 5/1954 | Badger, Jr. | 137/614.06 |
| 4,030,524 | 6/1977 | McMath et al. | 137/614.06 |
| 4,359,066 | 11/1982 | Hunt | 137/614.06 |
| 4,567,924 | 2/1986 | Brown | 141/207 |
| 5,273,071 | 12/1993 | Oberrecht | 137/614.06 |
| 5,405,120 | 4/1995 | Kerpan et al. | 239/586 X |
| 5,540,413 | 7/1996 | Brown | 141/384 X |
| 5,671,777 | 9/1997 | Allen | 137/614.06 |

*Primary Examiner*—Andres Kashnikow
*Assistant Examiner*—Robin O. Evans
*Attorney, Agent, or Firm*—Roy A. Ekstrand

[57] ABSTRACT

An aircraft fueling nozzle includes a generally cylindrical nozzle body having an extending adaptor receiver housing within which a rotatable interlock ring is supported. A generally planar annular locking lug retainer overlies the interlock ring and is secured to the upper surface of the adaptor receiver housing. A valve seat is supported upon a center wall of the interlock ring and supports a valve seat which cooperates with a valve poppet for fuel flow control. The nozzle body defines a vertical channel within which a movable poppet link is disposed and movable. The interlock ring defines a downwardly extending plate which is rotatable between positions covering a portion of the vertical channel and exposing the vertical channel. A valve actuating mechanism operable by a crank handle is coupled to the valve poppet and the poppet link and is prevented from opening when in the closed position until the interlock ring is properly aligned and is prevented from closure when in the open position until the interlock ring is properly aligned for nozzle removal from the aircraft.

19 Claims, 5 Drawing Sheets

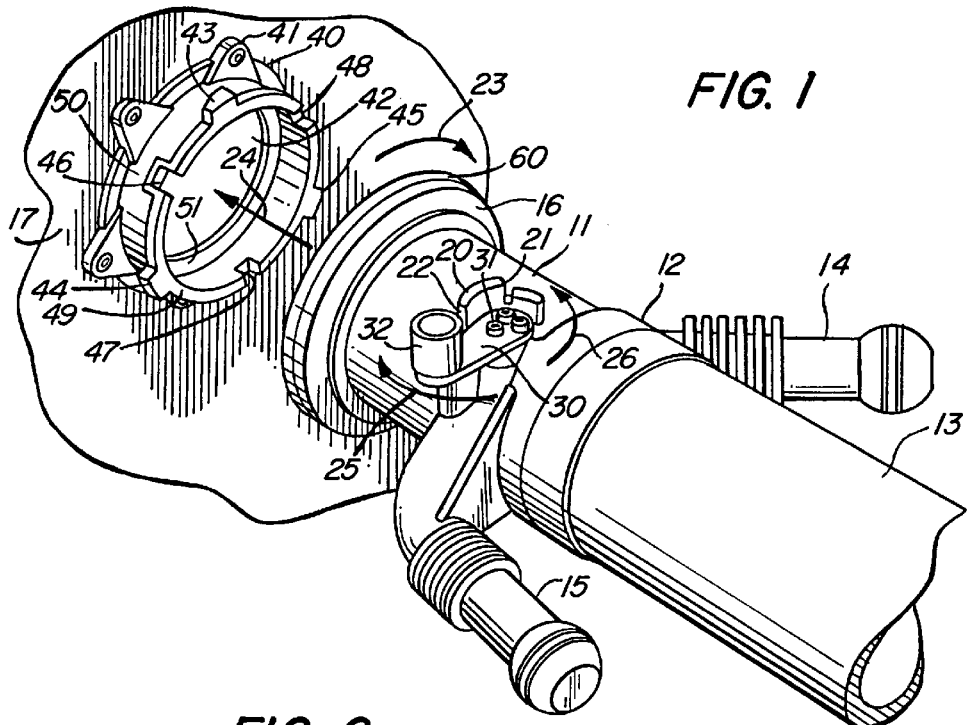
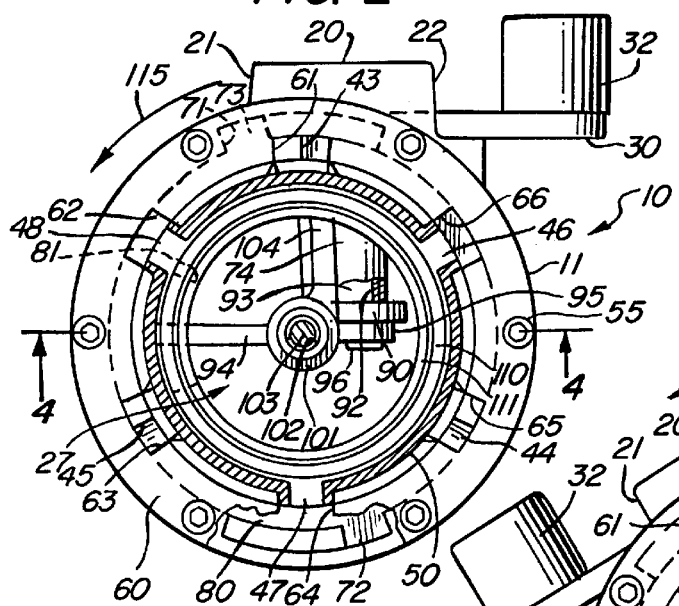
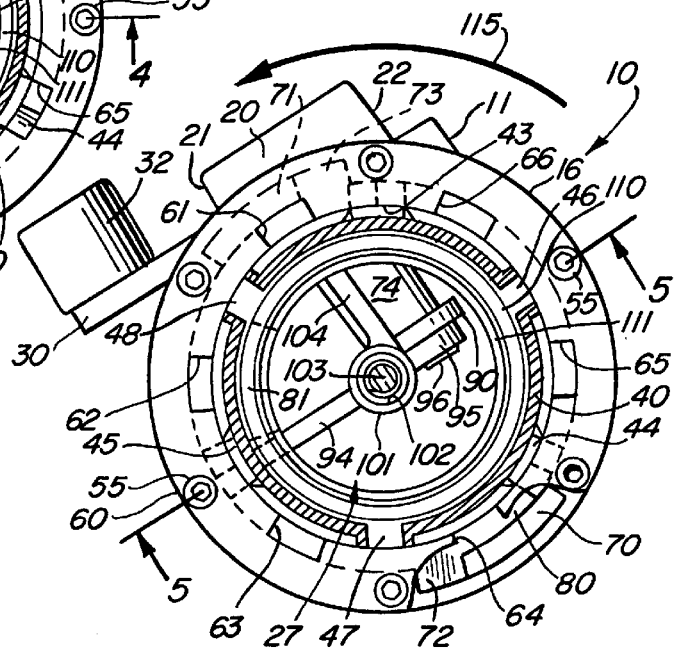

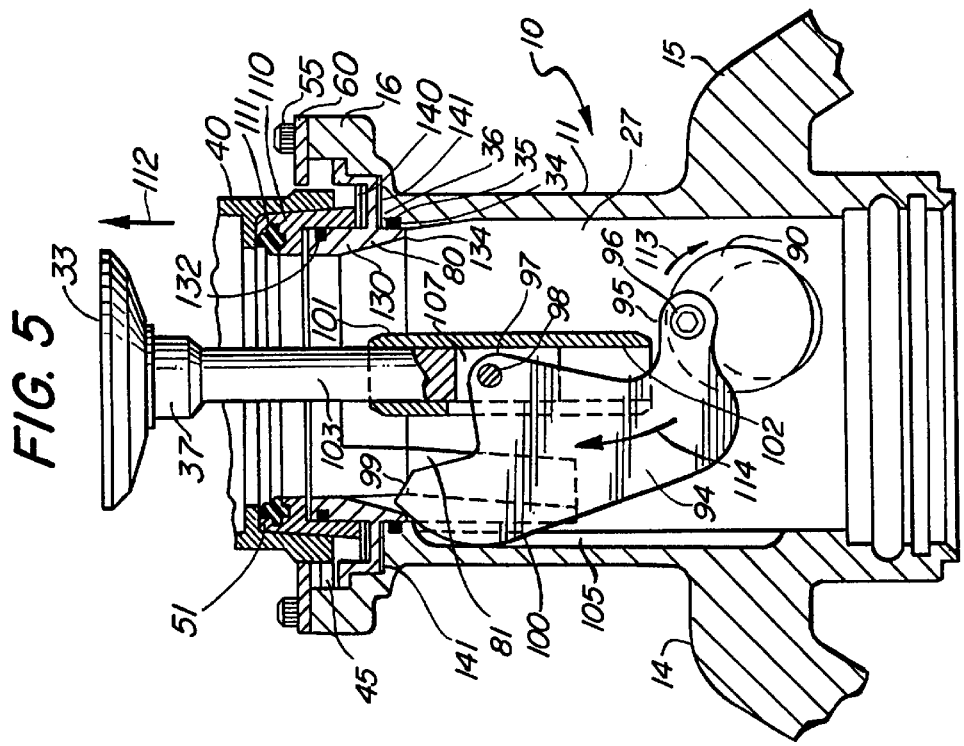
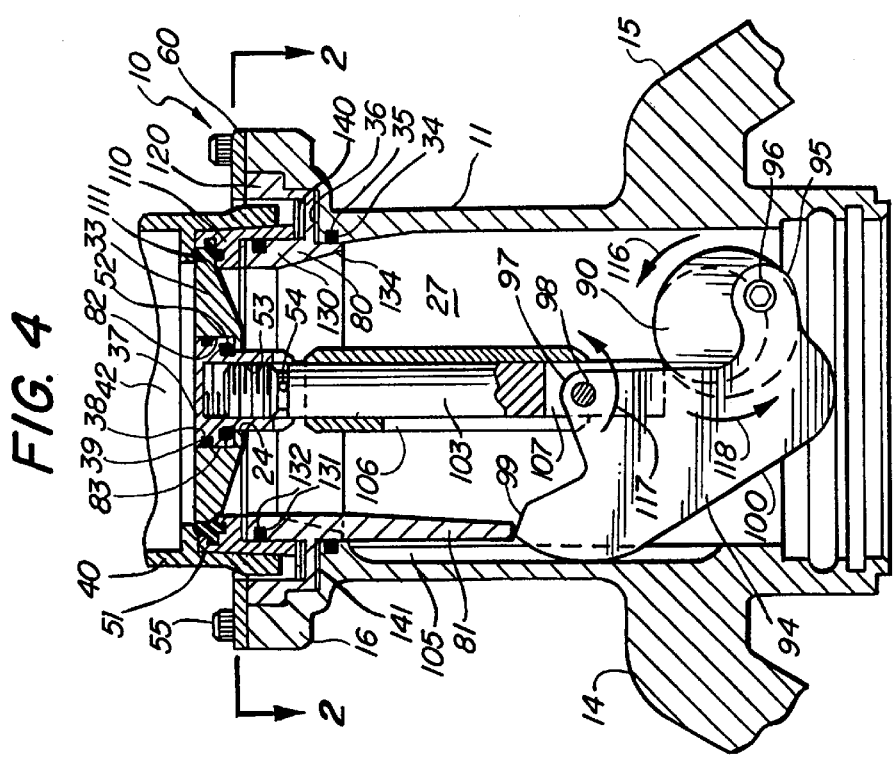

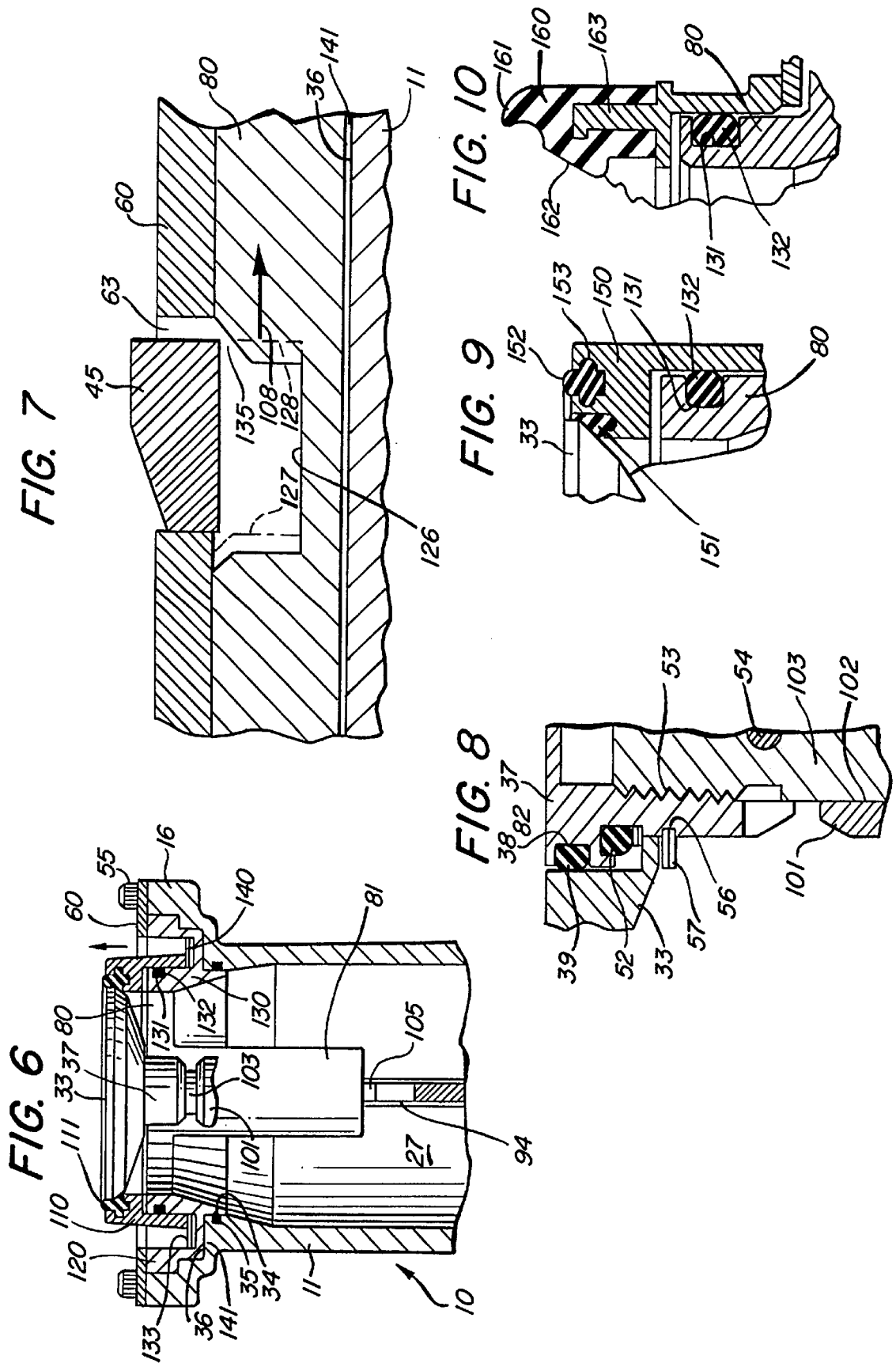

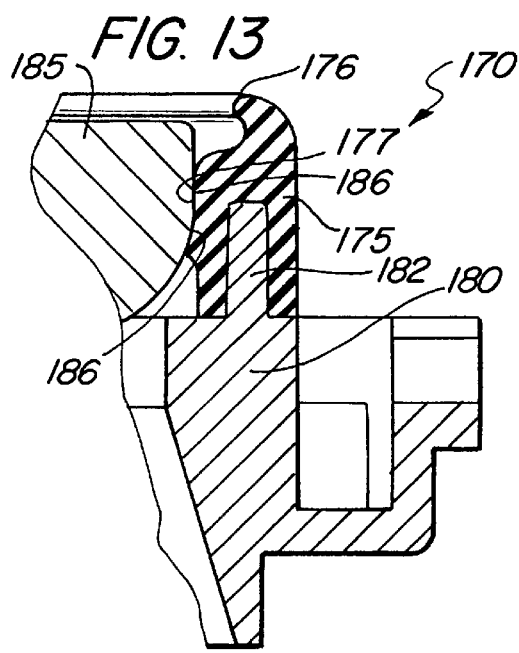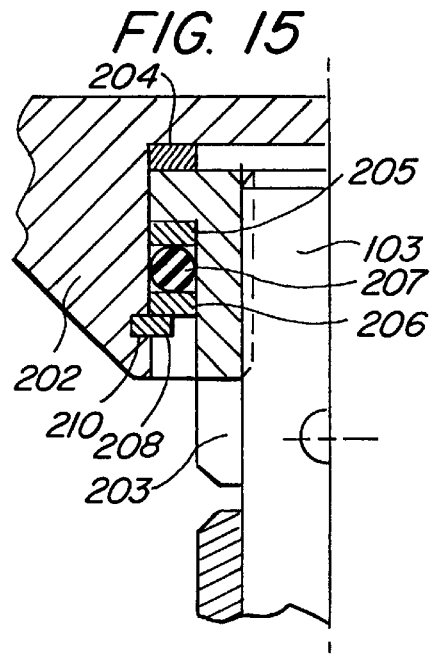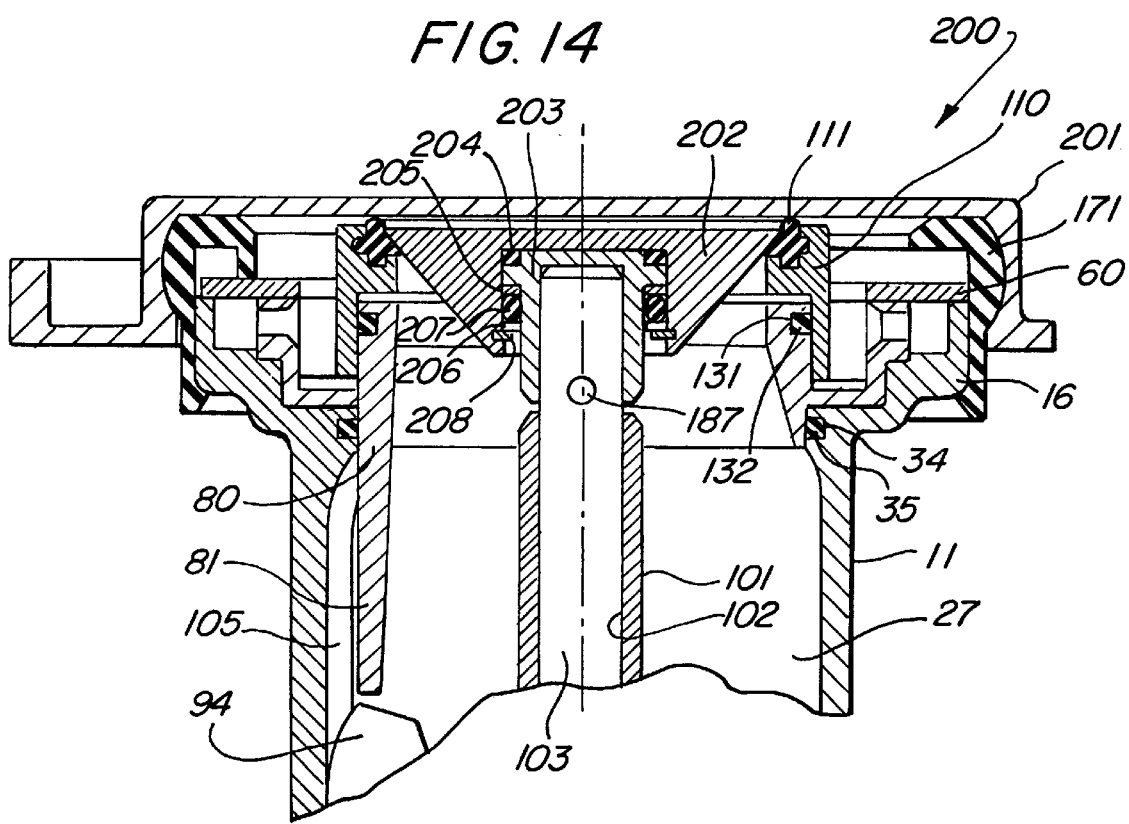

AIRCRAFT FUELING NOZZLE

FIELD OF THE INVENTION

This invention relates generally to aircraft fueling apparatus and particularly to the fueling nozzles used to couple fuel supply truck hoses to aircraft fueling adaptors.

BACKGROUND OF THE INVENTION

The general operation of fueling aircraft for both military and commercial operations has become relatively uniform throughout the various aircraft service industries. Basically, fuel is supplied by fuel trucks having large fuel reservoirs and independent fuel pumping apparatus together with extended large diameter fueling hoses. The fuel hoses terminate in a fueling nozzle which includes a hand operated fueling valve often referred to as a poppet or poppet valve. The fueling nozzle valves are typically opened and closed by the manipulation of a rotating lever or crank. Correspondingly, the aircraft includes a fuel line which terminates in an externally accessible fueling port for receiving fuel. The fueling port includes an adaptor configured to receive and engage the fueling nozzle in a positive interlock attachment for safety of operation. The typical fueling adaptor used on most aircraft today includes an annular cylindrical portion extending outwardly from the fuel port which in turn defines a plurality of interlock notches and adaptor lugs for engaging corresponding notches and lugs within the fueling nozzle.

The operation of fueling an aircraft involves bringing a fuel truck in close proximity to the aircraft and thereafter playing out a quantity of fueling hose having a fueling nozzle at the end which is then engaged with and secured to the aircraft adaptor. Once engagement is complete, the fuel nozzle valve is opened and the operator initiates the pumping of fuel into the aircraft. At the completion of the fuel transfer, the valve is then closed and the pumping operation is terminated. Finally, the nozzle is removed from the adaptor and the hose is wound back upon the fueling truck completing the operation.

The extremely volatile and potentially explosive quality of the aircraft fuels used necessitate the careful and safety conscious operation of aircraft refueling. The need to maintain safe operation is rendered more difficult in the typical fast pace action of modern high traffic aircraft facilities and the pressure for rapid turnaround of aircraft while on the ground. Further, aircraft are generally most likely to be refueled in weather exposed circumstances subjecting the fueling operators to a variety of weather conditions. These constraints and difficulties by their very nature increase the ever present danger of fuel spill mishaps and the corresponding danger they present.

To help ensure the safety of aircraft fueling operations, various safety features are required in the design and structure of fueling equipment. In particular, the aircraft fueling nozzle is required to provide and maintain various safety features. The most prevalent of such safety features is found in two basic safety interlocks which the apparatus must possess. The first interlock is operative when the flow valve of the nozzle (often called the poppet) is in a closed condition. This interlock prevents the opening of the flow valve unless and until the fuel nozzle is properly engaged and interlocked with an airplane fueling adaptor. This prevents inadvertent opening of the fuel valve and fuel spillage when the nozzle is not connected to an aircraft. The second basic interlock is operative when the valve is in an open condition and the nozzle is engaged with a fueling adaptor during aircraft fueling operations. The interlock active under fueling conditions prevents the removal and disengagement of the fueling nozzle from the aircraft adaptor unless and until the fueled valve has been closed. This, of course, is utilized to prevent the disastrous possibility of inadvertent removal or accidental disengagement of a fueling nozzle from an aircraft while the high pressure fuel pump on the fueling truck is operative.

While safety of operation is essential and foremost in the design and maintenance of fuel nozzles, practitioners in the art also endeavor to enhance the use and operation of such nozzles in aircraft fueling by making the nozzles lighter and easier to handle and operate.

In response to these needs, practitioners in the art have provided a variety of aircraft fueling nozzle designs. For example, U.S. Pat. No. 2,679,407 issued to Badger, Jr. sets forth a NOZZLE FOR FUELING AND DRAINING TANKS having a curved tubular housing securable to the open end of a fuel line at one end and supporting a movable poppet valve and engaging mechanism at the opposite end. An elongated poppet rod extends downwardly from the poppet through an aperture formed in the curved tube. The poppet rod is coupled to a multiply linked crank mechanism which in turn is secured to an external crank lever operable by the user to open and close the poppet valve.

U.S. Pat. No. 4,030,524 issued to McMath, et al. sets forth a COUPLER FOR ATTACHMENT TO AN ADAPTOR together with apparatus which requires that the adaptor must be disposed within the coupler in the position of locking engagement before a rotatable shaft within the coupler may be rotated to initially lock the adaptor and coupler. The coupler includes a poppet valve which opens a valve in a passage in the adaptor when the coupler has properly engaged the adaptor.

U.S. Pat. No. 5,273,071 issued to Oberrecht sets forth DRY DISCONNECT COUPLINGS comprising an adaptor connected to a liquid conduit and a coupler connected to another liquid conduit. The adaptor and coupler each have poppets which seal passageway outlets thereof when they are disconnected. When connected, means are provided for simultaneously opening the poppets by displacing them with their end faces in contiguous relation.

While the foregoing described prior art devices have provided improvement in the art and, in some instances, enjoyed commercial success, there remains nonetheless a continuing need in the art for evermore improved effective, efficient and easy to use aircraft fueling nozzles.

SUMMARY OF THE INVENTION

Accordingly, it is a general object of the present invention to provide an improved aircraft fueling nozzle. It is a more particular object of the present invention to provide an improved aircraft fueling nozzle which maintains the appropriate safety interlocks using a relatively simple, lightweight and easy to manipulate interlock and valve mechanism.

In accordance with the present invention, there is provided for use in fueling an aircraft having a fueling adaptor defining a generally cylindrical wall, a fuel-receiving passage and a plurality of locking lugs, an aircraft fueling nozzle comprising: a nozzle body defining a fuel passage therethrough, a hose coupler at one end and an engaging end and means for engaging the fueling adaptor; a valve poppet supported upon the nozzle body movable between an open position and a closed position; a valve seal supported within the fuel passage having a sealing surface for contacting the valve poppet in the closed position; valve operating means for moving the valve poppet between the open and closed positions including a movable poppet link; and an interlock ring rotatably supported upon the nozzle body at the engaging end and having a plurality of interlock notches for receiving the locking lugs and a lock plate extending into the fuel passage, the interlock ring being rotatable between a first position preventing movement of the poppet link and a second position permitting movement of the poppet link while preventing rotation of the interlock ring to the first position until the valve poppet is in the closed position, the nozzle being secured to the fueling adaptor with the interlock ring in the first position and the valve poppet in the closed position by inserting the locking lugs of the fueling adaptor into the interlock notches of the interlock ring and rotating the nozzle body with respect to the fueling adaptor and the interlock ring so as to move the interlock ring to the second position.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of the present invention aircraft fueling nozzle in combination with a standard aircraft fueling adaptor;

FIG. 2 sets forth a top view of the present invention aircraft fueling nozzle aligned with a standard aircraft fueling adaptor which is shown in section view;

FIG. 3 sets forth a top view of the present invention aircraft fueling nozzle together with a section view of a standard aircraft fueling adaptor in which the nozzle is rotated upon the adaptor to the engaged fueling position;

FIG. 4 sets forth a section view of the present invention aircraft fueling nozzle taken along section lines 4—4 in FIG. 2 showing the present invention aircraft fueling nozzle in the closed position;

FIG. 5 sets forth a section view of the present invention aircraft fueling nozzle taken along section lines 5—5 in FIG. 3 showing the fueling valve of the present invention nozzle in the open position;

FIG. 6 sets forth a partial section view of the present invention aircraft fueling nozzle in the closed position;

FIG. 7 sets forth a partial section view showing the camming action which occurs between the interlock ring and aircraft adaptor to ensure alignment of the interlock ring for mating to the aircraft adaptor;

FIG. 8 sets forth an enlarged partial section view of the attachment and support of the valve poppet of the embodiment in FIGS. 1 through 6;

FIG. 9 sets forth an enlarged partial section view of an alternative valve seat structure;

FIG. 10 sets forth an enlarged partial section view of a still further alternate embodiment valve seat structure;

FIG. 13 sets forth an enlarged partial section view of the valve seat structure of the embodiment of the present invention shown in FIG. 12 in the closed position; and FIG. 14 sets forth a partial section view of a still further alternate embodiment valve seat structure in the closed position; and FIG. 15 sets forth an enlarged partial section view of the poppet attachment for the embodiments of FIGS. 12 and 14.

DESCRIPTION OF THE PREFERRED EMBODIMENTS

Figure 11:
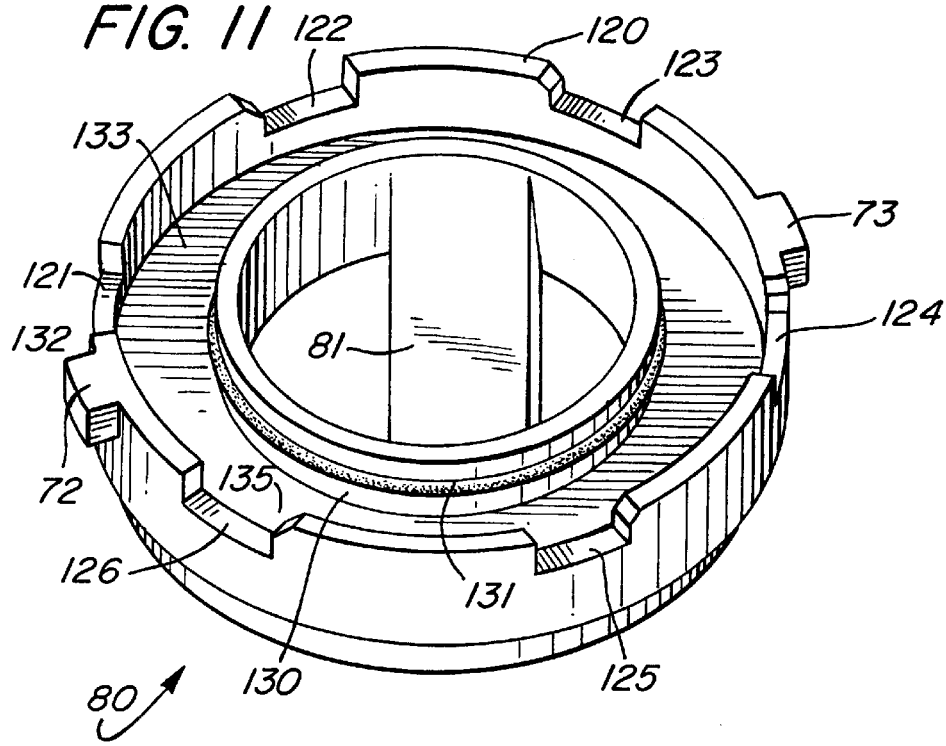
FIG. 11 sets forth a perspective view of the interlock ring of the present invention fueling nozzle.

FIG. 1 sets forth a perspective view of an aircraft fueling nozzle constructed in accordance with the present invention and generally referenced by numeral 10. Nozzle 10 is shown coupled to a conventional aircraft fueling hose 13 by a conventional hose coupler 12. Also shown in FIG. 1 is a portion of a fuel receiving aircraft 17 which in accordance with conventional fabrication techniques includes a fueling adaptor 40 secured thereto by a plurality of mounting flanges 41 and conventional fasteners. Aircraft 17, in further accordance with conventional fabrication techniques, supports a fuel passage 42 which is aligned with and sealingly coupled to fueling adaptor 40. Fueling adaptor 40 defines a generally cylindrical adaptor body 50 extending from mounting flanges 41 and supporting an annular interior surface 51. Adaptor body 50 terminates in a generally planar annular surface 49 defining a trio of notches 46, 47 and 48 together with a trio of outwardly extending locking lugs 43, 44 and 45 each spaced equally upon adaptor body 50. As mentioned above, fueling adaptor 40 and its attachment to aircraft 17 are entirely conventional in fabrication.

In accordance with the present invention, fueling nozzle 10 includes a nozzle body 11 having an outwardly extending adaptor receiver housing 16 at one end and a pair of angularly extending handles 14 and 15 near post coupler 12 at the opposite end. In the preferred fabrication of the present invention, the supports for handles 14 and 15 as well as the remainder of nozzle body 11 including adaptor receiving housing 16 are fabricated as a single cast metal member. Adaptor receiving housing 16 further supports a generally planar annular locking lug retainer 60 which, as is better seen in FIGS. 2 and 3, defines a plurality of radially spaced notches 61 through 66 sufficient in size to receive locking lugs 43 through 45 of fueling adaptor 40. Nozzle body 11 further includes a curved stop fence 20 having an edge 21 and an edge 22 defined therein. As is better seen in FIGS. 2 and 3 below, nozzle body 11 supports a shaft 93 extending into the interior of nozzle body 11 having one end secured to a valve actuating arm 30 by a plurality of fasteners 31. The structure supported by shaft 93 is set forth below in greater detail. However, suffice it to note here that the operative mechanism coupled to valve actuating arm 30 facilitates the opening and closing of the fuel valve or poppet through the pivotal motion of valve actuating arm 30. For convenience, arm 30 further supports a crank handle 32.

In operation and assuming nozzle 10 is configured in the closed position as indicated by the position of arm 30 in FIG. 1, nozzle 10 commences a fueling operation as the operator aligns adaptor receiver housing 16 with fueling adaptor 40 and thereafter moves nozzle 10 forwardly in the direction indicated by arrow 24 bringing adaptor 40 into locking lug retainer 60 such that locking lugs 43 through 45 are aligned with a corresponding trio of notches 61 through 66 (seen in FIG. 2) formed in receiver housing 16. Once proper alignment is obtained, the operator then moves nozzle 10 forwardly again to insert lugs 43 through 45 into adaptor receiver housing 16 past locking lug retainer 60. At this point, the operator then rotates nozzle 10 in the direction indicated by arrow 23 which as is described below in greater detail moves locking lugs 43 through 45 beneath their respective notches in locking lug retainer 60 and thereby secures the engagement of nozzle 10 to fueling adaptor 40. In accordance with the present invention and as described below in greater detail, this rotation of nozzle 10 in the direction of arrow 23 releases the interlock which has thus far prevented the pivoting of arm 30 thereby preventing accidental opening of the valve within nozzle 10. With the interlock released due to proper engagement of nozzle 10 to adaptor 40, the operator then pivots arm 30 to the open position indicated by arrow 26. Edge 21 provides a travel limit stop for arm 30 and defines the fully open valve position.

During the fueling operation, a second interlock mechanism constructed in accordance with the present invention and set forth below in detail is operative upon nozzle 10 to prevent the disengagement or removal of nozzle 10 from fueling adaptor 40 so long as the internal valve within nozzle 10 is in the open position. At the completion of the fueling operation, the operator must rotate valve actuating arm 30 back to the closed position in the direction indicated by arrow 25 until arm 30 abuts edge 22 of stop fence 20. Edge 22 provides a travel limit stop for arm 30 which defines the fully closed position of the internal valve.

In further accordance with the present invention and as is also described below, the return of valve actuating arm 30 to the fully closed position releases the interlock which had prevented disengagement of nozzle 10 during the fueling action. Accordingly, the operator is then able to disengage nozzle 10 by rotating it in the opposite direction of arrow 23 and withdrawing it from adaptor 40.

FIG. 2 sets forth a partially sectioned top view of the present invention fueling nozzle engaged with a fueling adaptor 40. For better illustration of the structure of nozzle 10, fueling adaptor 40 is shown in section view taken along section lines 2—2 in FIG. 4. Also, for better illustration of the valve actuating mechanism within nozzle 10, valve poppet 33 (seen in FIG. 4) is removed and poppet shaft 103 is shown in section view. As described above, nozzle 10 includes a nozzle body 11 rotatably supporting a valve actuating arm 30 having a crank handle 32 at one end thereof. As is also described above, nozzle body 11 defines an outwardly extending stop fence 20 having opposed edges 21 and 22 which serve to provide travel limits for valve actuating arm 30. Nozzle body 11 further defines a generally cylindrical fuel passage 27 extending through nozzle body 11. An inwardly extending boss 74 defines a bore 92 extending therethrough which receives and supports a rotatable valve actuating shaft 93. Shaft 93 is coupled to arm 30 using a plurality of fasteners 31 (seen in FIG. 1) at the outside of nozzle body 11. The interior end of shaft 93 is integrally formed to an eccentric member 90. A generally planar web 104 extends inwardly within fuel passage 27 above boss 74 and supports a vertically disposed generally cylindrical sleeve 101 at the center of fuel passage 27. Sleeve 101 defines a bore 102 which as is better seen below in FIGS. 4 and 5 supports a cylindrical elongated poppet shaft 103. Nozzle 10 further includes a poppet link 94 which as is better shown in FIGS. 4 and 5 includes a lobe 95 which is coupled to eccentric 90 by a crank pin 96. As is also better seen in FIG. 4, poppet link 94 includes a lobe 97 secured to poppet shaft 103 by a pin 98. Poppet link 94 further includes an end 99 which extends outwardly from lobes 95 and 97 and is received within a vertical channel 105 (seen in FIG. 6) defined on the interior surface of fuel passage 27.

Nozzle 10 further includes an interlock ring 80 having a pair of outwardly extending oppositely positioned tabs 72 and 73 together with a downwardly extending lock plate 81. Tabs 72 and 73 are received within a pair of arcuate notches 70 and 71 formed in adapter receiving housing 16 of nozzle body 11. Thus, interlock ring 80 is rotatable with respect to nozzle body 11 through an angular range determined by the travel of tabs 72 and 73 of interlock ring 80 within notches 70 and 71 formed in nozzle body 11. In the position shown in FIG. 2, interlock 80 is positioned in its maximum counterclockwise position and thus tabs 72 and 73 are positioned at the extreme counterclockwise ends of notches 70 and 71 respectively. This rotational position of interlock ring 80 corresponds to the closed valve position of nozzle 10 and accordingly and in accordance with an important aspect of the present invention, this rotational position of interlock ring 80 positions lock plate 81 across channel 105 (seen in FIG. 6) thereby interlocking the valve mechanism of nozzle 10 in the closed position.

Nozzle 10 further includes a generally cylindrical valve seat 110 which supports a resilient annular valve seal 111. As is better seen in FIG. 6, valve seat 110 is received upon a generally cylindrical center wall 130 formed in interlock ring 80. It should be recalled that the section view in FIG. 2 shows nozzle 10 with the valve poppet removed. However, it will be understood that in the closed position of nozzle 10, the valve poppet would ordinarily be seated upon valve seat 11 providing a closure to fuel passage 27.

Thus, in the closed valve position of FIG. 2, nozzle 10 is in essence ready for engagement with an aircraft fueling adaptor such as fueling adaptor 40. Adaptor 40 is shown at the initial stage of engagement with nozzle 10 in that adaptor 40 is aligned with nozzle 10 such that locking lugs 43, 44 and 45 of adaptor 40 are aligned with lug notches 61, 65 and 63 respectively of locking lug retainer 60. Interlock ring 80 shown in FIG. 2 also aligns notches 122, 124 and 126 of interlock ring 80 with notches 63, 61 and 65 of locking lug retainer ring 60 with locking lugs 45, 43 and 44 of adaptor 40. In addition to positioning lock plate 81 across channel 105 (seen in FIG. 6), the counterclockwise position of interlock ring 80 also aligns notches 122, 124 and 126 of interlock ring 80 with notches 63, 61 and 65 respectively of locking lug retainer 60. As a result, the alignment of nozzle 10 with respect to fueling adaptor 40 which positions locking lugs 43, 44 and 45 with notches 61, 65 and 63 respectively of locking lug retainer 60 also produces a corresponding alignment with notches 124, 126 and 122 of interlock ring 80. As a result, adaptor 40 and nozzle 10 are properly aligned to fully insert locking lugs 43, 44 and 45 into their respective notches of interlock ring 80. Once fueling adaptor 40 is fully inserted into nozzle 10, locking lugs 43, 44 and 45 are beneath locking lug retainer 60. As a result, the engagement of nozzle 10 with fueling adaptor 40 is completed by simply rotating nozzle 10 in the counterclockwise direction indicated by arrow 115. During this counterclockwise rotation of nozzle 10 with respect to fueling adaptor 40 which it should be recalled is fixedly mounted to aircraft 17, interlock ring 80 remains engaged by locking lugs 43, 44 and 45 of adaptor 40 and thus remains stationary as nozzle body 11 and locking lug retainer 60 rotate during the rotation of nozzle 10. The relative rotation of interlock ring 80 and fueling adaptor 40 with respect to the remainder of nozzle 10 moves locking lugs 43, 44 and 45 of fueling adaptor 40 beneath locking lug retainer 60 captivating fueling adaptor 40. Concurrently, the relative rotation of interlock ring 80 moves lock plate 81 to one side of channel 105 (seen in FIG. 6). As will be described below in greater detail, this rotation of nozzle 10 to complete the engagement of fueling adaptor 40, also releases the interlock action of lock plate 81 which has thus far prevented opening of the poppet valve within nozzle 10.

FIG. 3 sets forth an identical section view of nozzle 10 and adaptor 40 to that shown in FIG. 2 with the difference being the completion of counterclockwise rotation of nozzle 10 with respect to fueling adaptor 40 described above. Thus, with nozzle 10 fully rotated in the counterclockwise direction indicated by arrow 115, tabs 72 and 73 of interlock ring 80 are positioned in their maximum clockwise positions within notches 70 and 71 of nozzle body 10.

As described above, nozzle body 10 includes a generally cylindrical nozzle body 11 defining a fuel passage 27 therethrough and an adaptor receiver housing 16 extending outwardly from nozzle body 11. Housing 16 in turn defines a pair of arcuate oppositely positioned notches 70 and 71 on each side of fuel passage 27 together with a curved stop fence 20 having edges 21 and 22 extending outwardly from the approximate midportion of nozzle body 11. Within fuel passage 27, nozzle body 11 further defines an inwardly extending boss 74 and a supporting web 104. As is better seen in FIG. 2, boss 74 defines a bore 92 which receives a cylindrical shaft 93 having an integrally formed eccentric member 90 on its interior end and its outer end coupled to a valve actuating arm 30 by a plurality of fasteners 31 (better seen in FIG. 1). As is also described above, eccentric 90 is further coupled to a lobe 95 formed in a poppet link 94 by a conventional fastener 96. As is better seen in FIG. 4, poppet link 94 further defines a lobe 97 coupled to poppet shaft 103 by a pin 98.

In accordance with the present invention, nozzle body 10 defines a vertically extending channel 105 within the interior of fuel passage 27. In further accordance with the present invention and as is better seen in FIG. 4, poppet link 94 defines an outer edge 100 and an end 99. Outer edge 100 defines a curved surface which is received within channel 105 as is better seen in FIG. 4.

Nozzle body 11 further defines a vertically extending sleeve 101 defining a center 102 which is joined to and supported by web 104. An elongated poppet shaft 103 is slidably supported within bore 102 and defines a lower end which as mentioned above is coupled to lobe 97 of poppet link 94. The upper end of poppet shaft 103 is further coupled to a movable valve poppet 33 as is seen in FIGS. 4 and 5.

In further accordance with the present invention, an interlock ring 80 shown in perspective view in FIG. 11 defines an annular cylindrical wall 120 and is rotatably supported within adaptor receiver housing 16 of nozzle body 11 such that tabs 72 and 73 of interlock 80 extend into notches 70 and 71 respectively of nozzle body 11. An annular flat locking lug retainer 60 is secured to the upper surface of adaptor receiver housing 16 and captivates interlock ring 80 within nozzle body 11. Locking lug retainer 60 is secured by a plurality of conventional threaded fasteners 55 and defines a plurality of equally spaced notches 61 through 66.

An aircraft fueling adaptor 40 defines a trio of radially extending locking lugs 43, 44 and 45 which are sized to fit through notches 61 through 66 in locking lug retainer 60 and to be easily received within notches 121 through 126 of interlock ring 80. In the position shown in FIG. 3, the trio of locking lugs of fueling adaptor 40 have been received within notches 61, 63 and 65 of locking lug retainer 60 as well as notches 122, 124 and 126 (seen in FIG. 11) of interlock ring 80. The subsequent rotation of nozzle 10 in the direction indicated by arrow 115 produces a relative rotation between nozzle body 11 and locking lug retainer 60 with respect to fueling adaptor 40 and interlock ring 80. The extent of this rotation is limited by the movement of tabs 72 and 73 of interlock ring 80 within notches 70 and 71 respectively.

Of importance with respect to the present invention, the rotation of nozzle 10 taking place between the positions shown in FIGS. 2 and 3 results in a relative rotation of interlock ring 80 to the position shown in FIG. 3. It should be recalled that the position shown in FIG. 2 is that in which an interlock preventing fuel valve opening is provided in that the position of interlock ring 80 places lock plate 81 across channel 105 within nozzle body 11 as shown in FIG. 4. In this position, the upward movement of poppet link 94 required to open the poppet valve is prevented and the desired safety interlock preventing inadvertent fuel valve opening without attachment to an aircraft is prevented. Conversely, in the rotated position shown in FIG. 3, nozzle 10 has been completely mated to and engages fuel adaptor 40. In accordance with the present invention, the relative rotation between interlock ring 80 and nozzle body 11 moves lock plate 81 away from channel 105 to the position better seen in FIG. 5. As a result, poppet link 94 is freely movable under the urging of arm 30 and the linkage described below and thus no interlock preventing fuel valve opening is enforced. Thus, with nozzle 10 fully secured in the manner shown in FIG. 3, the fuel valve interlock is released.

It will be recalled from the above-described operation of aircraft fueling nozzles that safe operation also requires a second interlock which prevents the removal of the fuel nozzle from an aircraft unless and until the fuel valve has again been returned to the fully closed position. With temporary reference to FIGS. 3 and 5 taken together, it should be noted that the opening of the poppet valve accomplished by rotation of arm 30 to raise poppet shaft 103 shown in FIG. 5 also moves poppet link 94 upwardly within channel 105 to a position immediately adjacent one edge of lock plate 81 of interlock ring 80. As a result of this position and returning to FIG. 3, it will be apparent that attempts to remove nozzle 10 from fueling adaptor 40 by rotation in the clockwise direction opposite to that shown in arrow 115 are prevented by the interference by poppet link 94 and lock plate 81. Thus, in the event the operator attempts to remove nozzle 10 from adaptor 40 while the poppet valve is in the open position, the engagement of interlock ring 80 and fueling adaptor 40 maintains the position of lock plate 81 within the travel path of poppet link 94 and completely prevents the rotation necessary for disengagement of nozzle 10. As a result, it will be apparent that a positive safety interlock is provided which may only be released as the user closes the poppet valve rotating arm 30 and returning poppet link 94 to its lowered position shown in FIG. 4. Once this is accomplished, the rotation of nozzle 10 is no longer interlocked and nozzle 10 now having a closed fuel valve may be withdrawn from adaptor 40.

FIG. 4 sets forth a section view of nozzle 10 taken along section lines 4—4 in FIG. 2. FIG. 4 shows nozzle 10 in the closed valve position in which fueling adaptor 40 has been mated to nozzle 10 prior to the above-described rotation to complete engagement of fueling adaptor 40 by nozzle 10. By way of contrast, FIG. 5 sets forth a section view of nozzle 10 taken along section lines 5—5 in FIG. 3 showing nozzle 10 fully engaged with fueling adaptor 40 and having the poppet valve opened to permit fuel flow.

Thus, with simultaneous reference to FIGS. 4 and 5, nozzle 10 includes a generally cylindrical nozzle body 11 having a fueling passage 21 extending therethrough. Nozzle body 11 supports a pair of a angularly disposed handles 14 and 15 together with an extending adaptor receiving housing 16. Adaptor receiving housing 16 defines an annular surface 36 which receives and supports an interlock ring 80. Interlock ring 80 is supported in a rotational support upon surface 36 of nozzle body 11 upon a thrust bearing 141 preferably fabricated of a self-lubricating material such as teflon or the like. Interlock ring 80 further includes a cylindrical wall 120 extending upwardly within adaptor receiving housing 16. Nozzle 10 further includes a generally flat annular locking lug retainer 60 which is secured to the upper surface of housing 16 by a plurality of fasteners 55. Locking lug retainer 60 extends above cylindrical wall 120 captivating interlock ring 80 within adaptor receiving housing 16.

Nozzle body 11 further defines a groove 34 within which an O-ring seal 35 is received. Seal 35 provides a fluid tight seal between nozzle body 10 and interlock ring 80. In accordance with the present invention, interlock ring 80 includes a downwardly extending lock plate 81 which in the closed position shown in FIG. 4 spans channel 105 formed in fuel passage 27 of nozzle body 11. Nozzle body 11 also supports a cylindrical sleeve 101 in the interior of fuel passage 27 having a bore 102 defined therein. Sleeve 101 further defines an elongated slot 106. An elongated poppet shaft 103 is slidably received within bore 102 and defines a vertical notch 107 at the lower end thereof. Shaft 103 further defines a threaded upper portion and a retaining pin 54. Nozzle 10 further includes a generally cylindrical valve seat 110 received upon center wall 130 of interlock ring 80. Center wall 130 further defines a groove 131 receiving an O-ring seal 132. O-ring 132 provides a fluid tight sealing between valve seat 110 and interlock ring 80. Valve seat 110 further supports a cruciform-shaped seal 111 which encircles the cylindrical upper surface of valve seat 110.

A valve poppet 33 is configured to provide sealing engagement with seal 111 and defines a center recess 82 having a bearing surface 83 formed therein. A poppet head 37 defines a threaded passage 53 received upon the threaded upper end of poppet shaft 103. Poppet head 37 supports a plurality of ball bearings 52 which are captivated against surface 83 of poppet head 30. Poppet head 30 further defines a groove 38 having an O-ring seal 39 received therein. O-ring seal 39 provides a fluid tight seal between poppet head 37 and poppet 33. Bearing 52 provides for rotational movement between valve poppet 33 and poppet head 37. Pin 54 completes the attachment of poppet head 33 and thus together with the threaded engagement within aperture 53 secures poppet head 37 and valve poppet 33 to poppet shaft 103. However, as will be described below in greater detail, valve poppet 33 is freely rotatable with respect to shaft 103 and poppet head 37.

As described above and as is better seen in FIG. 2, sleeve 101 is supported within passage 21 by a supporting web 104. As is also better seen in FIG. 2, an eccentric 90 is secured to the interior end of a shaft 93 which in turn is coupled to a valve actuating arm 30. Thus, returning to FIG. 4, an eccentric 90 is integrally formed on the interior end of shaft 93 which in turn is pivotally coupled to a lobe 95 of a poppet link 94 by a crank pin 96. Of importance in the operation of the present invention is the offset or eccentric coupling of lobe 95 to eccentric 90. Poppet link 90 further includes a curved outer edge 100 terminating in an upper end 99. Poppet link 94 further includes an intermediate lobe 97 which is pivotally coupled to poppet shaft 103 by a pin 98. Notch 107 in shaft 103 facilitates the pivotal coupling of poppet link 94 by providing clearance for rotational motion of link 94 about pin 98.

In the closed valve configuration shown in FIG. 4, adaptor 40 is inserted into nozzle 10 extending past locking lug retainer 60 and into the upper portion of interlock ring 80. In accordance with an advantage of the present invention structure, a wave spring 140 fabricated in accordance with conventional fabrication techniques in which a spring steel annular flat member is provided with an undulating series of curvatures giving the wave spring compressibility. Wave spring 140 thus supports valve seat 110 upon center wall 130 of interlock ring 80 in a slightly resilient support which allows the combined structure of valve seat 110, poppet valve 33 and poppet head 37 to accommodate slight errors in alignment of fueling adaptor 40 during the initial engaging process. This alignment capability allows the combination of valve seat 110, valve poppet 33 and poppet head 37 to newtate or shift slightly or facilitate any misalignment. In its preferred form, valve spring 140 defines a substantially strong spring constant and thus further provides a force acting upon valve seat 110 which ensures the proper sealing between seal 111 and surface 51 of fueling adaptor 40.

With specific reference to FIG. 4 in which the fueling valve of nozzle is positioned in the closed position, valve actuating arm 30 has been rotated to the fully closed position shown in FIG. 2. This rotation of valve actuating arm 30 produces a corresponding counterclockwise rotation of eccentric 90 in the direction indicated by arrow 116. The pivotal coupling between lobe 95 of poppet link 94 and eccentric 90 provides a simultaneous downward motion acting upon poppet link 94 in the direction indicated by arrow 118 and a pivoting motion of poppet 94 about pin 98 in the direction indicated by arrow 117. This downward and counterclockwise pivoting motion of poppet link 94 produced by rotation of eccentric 90 lowers end 99 of poppet link 94 to a position beneath the bottom edge of lock plate 81. It should be noted that the travel motion of poppet link 94 with respect to eccentric 90 provides a "over center" motion which in effect maintains the closure of valve poppet 33 against seal 111 despite substantial fuel pressure exerted upon valve poppet 33 by fuel within passage 21. But for this over center range of motion, such forces against valve poppet 33 might not be successfully resisted. With poppet link 94 positioned as shown in FIG. 4 due to closure of valve poppet 33 against seal 11, lock plate 81 is rotatable to the position shown in which lock plate 81 spans channel 105. This position of lock plate 81 corresponds to the normal position of interlock ring 80 following the removal of nozzle 10 from fueling adaptor 40. Thus, in the closed valve position of FIG. 4, nozzle 10 is able to be withdrawn from adaptor 40 as it would at the completion of a fueling operation or, alternatively, is properly positioned for the above-described engaging rotation to secure nozzle 10 to adaptor 40 and facilitate a fueling operation. In either event of importance in accordance with the present invention is the extension of lock plate 81 across channel 105 to prevent opening of valve poppet 33 through rotation of arm 30 and thereby prevent the transfer or expelling of fuel without the nozzle being properly mated to a fueling adaptor.

With reference to FIG. 5 which shows nozzle 10 in the rotated or fully engaged position depicted in FIG. 3 above, the rotation of nozzle 10 with respect to fueling adaptor 40 has provided the necessary relative rotation of interlock 80 with respect to nozzle body 11 to release the fuel valve interlock. Thus, as will be seen in FIG. 5, interlock ring 80 is rotated with respect to nozzle body 11 such that lock plate 81 no longer spans channel 105 but rather is positioned alongside the channel. This rotation of lock plate 81 removes the abutment of end 99 of poppet link 94 against the lower edge of lock plate 81 allowing it to rise within channel 105. Poppet link 94 moves upwardly as the user moves actuating arm 30 in the direction indicated by arrow 26 in FIG. 1 until actuating arm 30 abuts stop edge 21 of stop fence 20. The rotation of actuating arm 30 as the user opens the fuel valve produces a clockwise rotation of eccentric 90 in the direction indicated by arrow 113. The pivotal offset attachment of lobe 95 of poppet link 94 to eccentric 90 converts this rotational motion of eccentric 90 into an upward motion as indicated by arrow 114 in which poppet link 94 is driven upwardly within channel 105 simultaneously raising poppet shaft 103 and valve poppet 33 in the direction indicated by arrow 112. Once again, it should be noted that the rotational position of lobe 95 and eccentric 90 resulting from the rotation of valve actuating arm 30 positions eccentric 90 and lobe 95 in an "over center" position whereby forces acting against valve poppet 33 do not affect the position of valve poppet 33. With valve poppet 33 fully opened, fuel flows outwardly through fuel passage 27 and adaptor 40 into the aircraft.

In further accordance with an important aspect of the present invention, the interaction of valve poppet 94, channel 105, and lock plate 81 prevents the rotation of nozzle 10 with respect to adaptor 40 needed to remove or disengage the fueling nozzle. In other words, this interlock prevents the rotation of interlock ring 80 back to the aligned position shown in FIG. 4 which is needed to remove the engagement of nozzle 10 from fueling adaptor 40. As a result so long as valve poppet 33 is not in the fully closed position, this interlock prevents the operator from disengaging the fuel nozzle from the aircraft. This, of course, is essential for safety reasons in that so long as valve poppet 33 is in the open position, highly volatile and flammable fuel is flowing outwardly from nozzle 10.

To complete the fueling operation, the user initially returns valve actuating arm 30 to the closed position shown in FIG. 1 which rotates eccentric 90 in the counterclockwise direction opposite to arrow 113. This counterclockwise rotation draws poppet link 94 downwardly carrying poppet shaft 103 in a corresponding downward direction and drawing valve poppet 33 against seal 111. As the user completes the rotational motion of valve actuating arm 30 to the fully closed position (seen in FIG. 1), eccentric 90 and poppet link 94 again assume the position shown in FIG. 4. Once the poppet valve is fully closed and poppet link 94 has reassumed the position shown in FIG. 4, lock plate 81 is again movable allowing rotation of interlock ring 80 to the necessary alignment shown in FIG. 2 afterwhich nozzle 10 may be withdrawn from fueling adaptor 40 completing the fueling process.

FIG. 6 sets forth a partial section view of nozzle 10 in the closed position shown in FIGS. 2 and 4. As described above, nozzle 10 includes a nozzle body 11 defining a fuel passage 27 extending therethrough. Nozzle body 11 further defines an outwardly extending adaptor receiver housing 16 having an annular surface 36 encircling fuel passage 27. Nozzle body 11 further defines an annular groove 34 which receives and supports an O-ring 35. In accordance with an important aspect of the present invention, nozzle body 11 also defines a vertical channel 105 within which poppet link 94 as is better seen in FIGS. 4 and 5 is movable.

In further accordance with the present invention, nozzle 10 includes an interlock ring 80 configured to be received within adaptor receiver housing 16 in a rotatable support. Interlock ring 80 includes a cylindrical wall 120 received within housing 16 and a generally cylindrical center wall 130. The latter defines a groove 131 within which an O-ring seal 132 is supported. Interlock ring 80 further includes a downwardly extending lock plate 81 which, in the closed valve position shown in FIG. 6, extends across channel 105 of nozzle body 11. A thrust bearing 141 preferably formed of a low friction bearing material such as teflon or the like is supported upon surface 36 of nozzle body 11 and receives a portion of interlock ring 80 in a low friction bearing support. Thus, the rotational movement of interlock ring 80 within nozzle body 11 is substantially free of friction and is limited solely by the interaction of tabs 72 and 73 within notches 70 and 71 of nozzle body 11 (better seen in FIG. 2). Nozzle 10 further includes a generally cylindrical valve seat 110 received upon center wall 130 of interlock ring 80. Valve seat 110 receives a valve seal 111 which extends upwardly and inwardly from valve seat 110. As is described above in greater detail, nozzle body 11 includes a cylindrical sleeve 101 which supports a poppet shaft 103 in a sliding arrangement. Shaft 103 further supports a poppet head 37 which in turn supports a valve poppet 33. Valve poppet 33 sealingly engages valve seal 111 when shaft 103 draws poppet 33 downwardly in the closed position shown in FIG. 6.

Nozzle 10 further includes a substantially planar annular locking lug retainer 60 secured to the upper surface of housing 16 by a plurality of conventional fasteners 55. Of importance to note in FIG. 6 is the manner in which lock plate 81 fully spans channel 105 in nozzle body 11 to provide the above-described interlock which prevents the opening of the poppet valve within nozzle 10 unless nozzle 10 has be properly seated upon and rotated into engagement with an aircraft fueling adaptor in the manner described in FIGS. 2 through 5 above. It will be recalled that once nozzle 10 has received an aircraft fueling adaptor and rotated with respect thereto into the correct rotational alignment, lock plate 81 is rotated away from channel 105 to permit poppet link 94 to rise and thereby permit the poppet valve to be opened.

FIG. 7 sets forth a partial section view of the present invention fuel nozzle which illustrates the ability of the present invention aircraft fueling nozzle to compensate for previous use upon an aircraft having a somewhat worn fueling adaptor. In essence, this problem arises when nozzle 10 is secured to an aircraft in which the fueling adaptor lugs have worn to a substantially smaller width. In such case, upon completion of the fueling activity and the closure of the poppet valve, the user is able to withdraw the nozzle from the fueling adaptor without fully rotating the nozzle to the maximum rotated position which would otherwise be necessary but for the worn and slightly smaller lugs present on the fueling adaptor. When this situation arises and the user withdraws the nozzle from the fueling adaptor without fully rotating to the maximum open position, a misalignment results between the interlock ring and the locking lug retainer which may prevent the next use of the fueling nozzle upon an aircraft having a less worn adaptor.

As is seen in FIG. 6, an interlock ring 80 defines a notch 126 and is received upon a thrust bearing 141. The latter is supported upon surface 36 of nozzle body 11 in the manner shown in FIG. 6. As described above, nozzle body 11 is secured to a locking lug retainer 60 which defines a notch 63 therein. For purposes of illustration, a locking lug 45 of the above-described aircraft fueling adaptor is shown in attempted insertion into locking lug retainer 60 and interlock ring 80 via notches 63 and 126 respectively. Dashed lines 127 and 128 in FIG. 7 depict the correct alignment between interlock ring 80 and locking lug retainer 60 which would result from a normal sized (unworn) adaptor locking lug. In the situation shown in FIG. 7, however, a previous use on a fueling adaptor having a smaller locking lug due to extensive wear has resulted in a slight misalignment between notch 126 of interlock ring 80 and notch 63 of locking lug retainer 60. The problem which arises is that a full-sized locking lug such as locking lug 45 is not able to be inserted into the misaligned interlock ring notch. This problem is alleviated by the combination of angled cam surface 135 on notch 126 and the use of thrust bearing 141 in supporting interlock ring 80. The low friction of thrust bearing 141 facilitates the easy movement of interlock ring 80 into correct alignment in the direction indicated by arrow 108 as locking lug 45 is forced downwardly against angle cam surface 135. As is better seen in FIG. 11, each notch of interlock ring 80 defines an angled camming surface such as surface 135 of notch 126. As a result, the easy rotation and cam surface action of interlock ring 80 facilitates a "self alignment" of interlock ring 80 with respect to the notches in locking lug retainer 60 in the event the above-described problem situation arises. It should be noted with temporary reference to FIG. 4 along with FIG. 7, that the rotational bearing support of poppet head 37 with respect to valve poppet 33 further facilitates this rotational alignment of interlock ring 80. In essence with the poppet valve of nozzle 10 in the closed position as shown in FIG. 4, valve poppet 33, valve seat 110, and interlock ring 80 must be free to rotate with respect to fueling adaptor 40, nozzle body 11 and poppet head 37 in order to accomplish this automatic realignment described and shown in FIG. 7. In this regard, the use of a rotational bearing coupling between poppet head 37 and valve poppet 33 facilitates this relative rotation allowing interlock ring 80 to self-align.

FIG. 8 sets forth a partial section view of the rotational support between poppet head 37 and valve poppet 33 upon poppet shaft 103. As described above, poppet shaft 103 is supported within nozzle 11 by a sleeve 101 having a bore 102 extending therethrough. A poppet head 37 defines a threaded aperture 53 which receives the threaded end of shaft 103 and supports poppet head 37. The position of poppet head 37 upon shaft 103 is secured by an interlock pin 54. Valve poppet 33 defines a recess 82 within which poppet head 37 is received. A groove 56 is formed within poppet head 37 and receives a retainer 57 which maintains the alignment of valve poppet 33 and poppet head 37. Poppet head 37 further defines a groove 38 within which an O-ring seal 39 is captivated. A bearing 52 is supported within poppet head 37 and preferably comprises a plurality of ball bearings maintained within recess 82 of valve poppet 83.

The important aspect with respect to the present invention of the drawing of FIG. 8 is the illustration of the bearing supported rotational coupling between poppet head 37 and valve poppet 33. This rotational coupling is advantageous in that poppet head 37 is secured to poppet shaft 103 and thus not rotatable. The use of bearing coupling support between poppet head 37 and valve poppet 33 allows valve poppet 33 to rotate with respect to poppet head 37 in the above-described self-aligning process for interlock ring 80 (seen in FIG. 6).

FIG. 9 sets forth an alternate embodiment of the present invention utilizing a different valve seat in place of valve seat 110 in the above-described embodiments. In all other respects, but for the use of a different valve seat generally referenced by numeral 150, it will be understood that the embodiment of FIG. 9 is otherwise identical to the embodiment described above in FIGS. 1 through 8. More specifically, valve seat 110 is received upon interlock ring 80 and sealed thereto by seal 132 received within groove 131. Valve seat 110 supports a poppet seal 151 which provides fuel tight closure with valve poppet 33. A separate adaptor seal 152 comprising a conventional circular cross-section O-ring is received within a cruciform groove 153 formed in valve seat 150. Cruciform groove 153 is formed by undercutting the groove within valve seat 110 in each direction to provide a "four corner" cross-section which is advantageous in its ability to engage and maintain the position of O-ring seal 152 as the corners deform the O-ring seal and hold it tightly against twisting forces which arise as nozzle 10 is rotated against fueling adaptor 40 in the manner described above in FIGS. 1 through 5.

FIG. 10 sets forth a still further alternate embodiment of the present invention which provides a still further alternative valve seat. Once again, it will be understood that, but for the valve seat utilized in the embodiment of FIG. 10, the remainder of the fueling nozzle used therewith is identical to that described above. Thus, once again, nozzle 10 includes an interlock ring 80 having a groove 131 formed therein which supports an O-ring seal 132. In the embodiment of FIG. 10, a seal frame 163 is received upon interlock ring 80 and defines an upwardly extending member which supports a combined seal 160. Combined seal 160 is fabricated of a single annular resilient seal which defines an angled poppet seat 162 and an extending adaptor seal 161.

FIG. 11 sets forth a perspective view of interlock ring 80. Interlock ring 80 defines a cylindrical wall 120 having a plurality of notches 121 through 126 formed therein in an equally spaced radial arrangement. Each of notches 121 through 126 define respective angled surfaces such as angled surface 135 shown on notch 126 which facilitate the above-described self aligning action of interlock ring 80. Interlock ring 80 further includes a generally cylindrical center wall 130 defining a groove 131 therein. Groove 131 receives an O-ring 132. An annular flat surface 133 extends between cylindrical wall 120 and center wall 130 and, as described above, receives wave spring 140. Interlock ring 80 further defines a reduced diameter wall 134 which configures interlock ring 80 to be received within adaptor receiver housing 16 of nozzle body 11 (seen in FIG. 2). In accordance with an important aspect of the present invention, interlock ring 80 includes a downwardly extending lock plate 81. As is described above, lock plate 81 facilitates the safety interlocks of fuel nozzle 10 described above.

Figure 12:
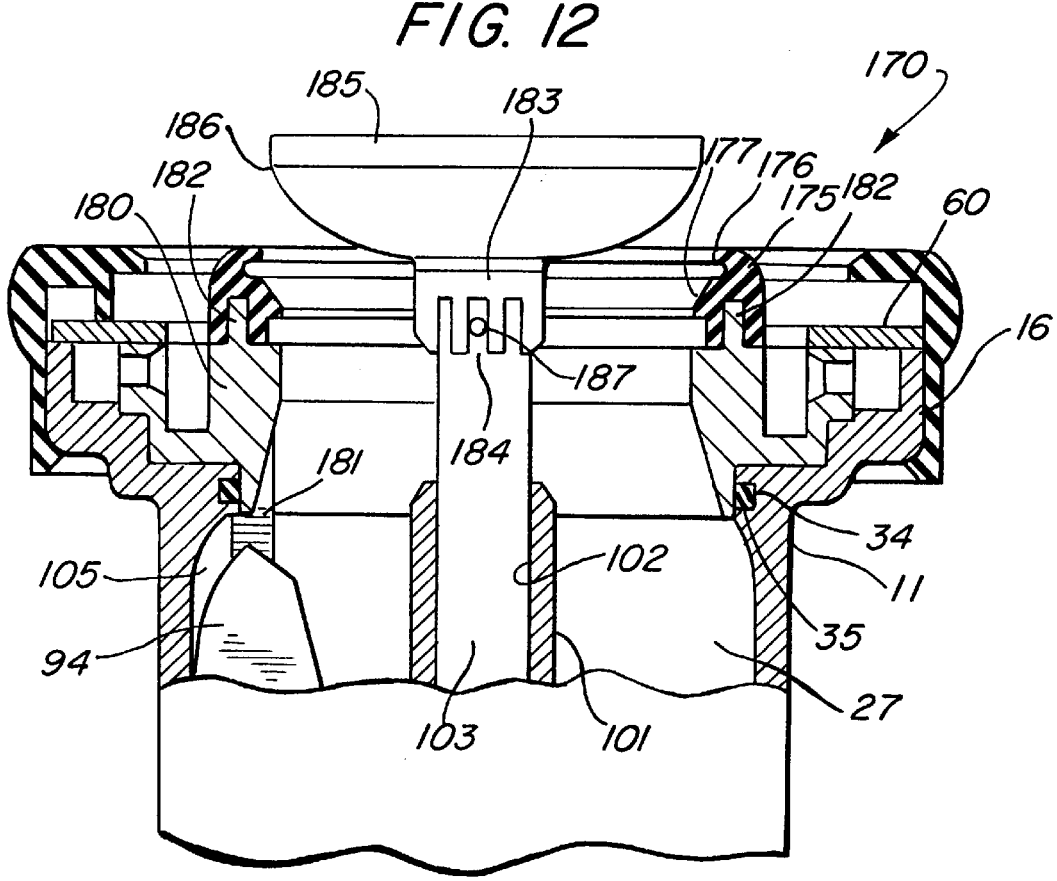
FIG. 12 sets forth a partial section view of an alternate embodiment of the present invention aircraft fueling nozzle in a partially open position.

FIG. 12 sets forth a partial section view of an alternate embodiment of the present invention aircraft fueling nozzle generally referenced by numeral 170. Nozzle 170 is substantially similar to nozzle 10 described above with the primary differences being a change to the interlock ring and seal configuration and a corresponding change to the poppet structure. Thus, it will be understood that nozzle 170 works in substantially the same manner as described above in receiving fueling adaptor 40 (seen in FIG. 1) and utilizing a rotating interlock ring to provide the fueling interlock described above in accordance with the present invention.

More specifically, nozzle 170 utilizes nozzle body 11 as described above having a fuel passage 27 extending therethrough. Also, as described above, nozzle body 11 supports a central sleeve 101 having a bore 102 extending therethrough. In further similarity to the above-described fueling nozzles, a poppet shaft 103 is slidably movable within bore 102 and, in the manner described above, is operatively coupled to a poppet link 94. Thus, as described above, the user rotates a handle (valve actuating arm 30 and crank handle 32 seen in FIG. 1) to move poppet shaft 103 and poppet link 94 in the above-described interlocking safety operation. In further similarity to the above-described embodiments, nozzle body 11 defines a groove 34 within which a seal such as a conventional O-ring seal 35 is received. Nozzle body 11 further defines an adaptor receiver housing 16 which cooperates with locking lug retainer 60 to provide reception and interlock to the locking lugs of fueling adaptor 40.

The primary difference in the structure of nozzle 170 is found in an interlock ring 180 which is substantially identical to interlock ring 80 (seen in FIG. 11) with the sole difference being the addition of a vertically extending annular fence 182. Fence 182 is provided to facilitate the attachment of a resilient seal 175. Seal 175 is substantially the same as combined seal 160 shown in FIG. 10. However, seal 175 is adhesively bonded to fence 182 to secure seal 175 directly to interlock ring 180. The remaining aspects of interlock ring 180 within nozzle body 11 are identical to those set forth above. Thus, the rotation of interlock ring 180 moves lock plate 181 into or out of alignment with channel 105 of nozzle body 11 to provide interlocking action with poppet link 94 as described above.

Seal 175 is fabricated of a resilient material and defines an upper edge 176 which is forced sealingly against surface 51 of fuel adaptor 40 (seen in FIG. 1) when nozzle 170 is engaged with a fueling adaptor. Seal 175 also defines a surface 177 which provides a poppet seal surface when poppet 185 is moved to the closed position shown in FIG. 13. The combination of interlock ring 180 and seal 175 adhesively bonded thereto greatly simplifies the fabrication and design of the present invention fueling nozzle.

Poppet 185 defines a convex seal surface 186 and a castelated fitting 183 secured to and extending from the undersurface of poppet 185. Poppet 185 is secured to poppet shaft 103 in the manner set forth below in FIGS. 14 and 15. Suffice it to note here that fitting 183 is received upon the end of poppet shaft 103 and secured thereto by a pin 187 cooperating with the aligned one of serrations 184.

Nozzle 170 is shown in a partially open position in which poppet shaft 103 and poppet link 94 have begun rising with nozzle body 11 as described above in opening the poppet valve. As is also described above, this rising or opening motion of poppet 185 and poppet link 94 is permitted only when interlock ring 180 is rotated as nozzle 170 is properly attached to a fueling adaptor.

FIG. 13 sets forth a partial section view of nozzle 170 shown in FIG. 12 in which poppet 185 is moved to the fully closed position. As described, nozzle 170 includes an interlock ring 180 having an upwardly extending annular fence 182. Fence 182 receives and supports an adhesively bonded resilient seal 175. In the preferred fabrication of the present invention, a layer of adhesive material is interposed between fence 182 and the contacting portions of interlock ring 180 to cover the entire surface area of seal 175 which is brought into contact with fence 182 and interlock ring 180. Thus, this adhesive attachment provides a secure bond between interlock ring 180 and seal 175 removing the need for a number of additional components in the above-described embodiments. Seal 175 defines an edge 176 which provides fuel passage sealing against surface 51 of adaptor 40 (seen in FIG. 1). Seal 175 further defines a surface 177 which is distorted as poppet 185 is forced inwardly against seal 17. Surface 186 is sealingly positioned against surface 177 of seal 175 to complete the closure and poppet seal of nozzle 170.

FIG. 14 sets forth a partial section view of a still further alternate embodiment of the present invention aircraft refueling nozzle generally referenced by numeral 200. Nozzle 200 is substantially identical to nozzle 10 shown in FIGS. 1 through 5. The primary difference between nozzle 200 and nozzle 10 is the use of an alternative poppet and poppet attachment mechanism which differs from valve poppet 33 in the above-described refueling nozzle 10. In all other respects, however, nozzle 200 should be understood to be substantially identical to nozzle 10. Further, the operation of nozzle 200 and the present invention interlocking system is identical to that described above for nozzle 10.

More specifically, nozzle 200 includes nozzle body 11 having fueling passage 27 and channel 105 formed therein. Nozzle body 11 as described above includes a centrally disposed sleeve 101 having a bore 102 therethrough which receives poppet shaft 103. Also, as described above, interlock ring 80 having an interlock plate 81 is supported within nozzle body 11 and sealed thereto using a seal 35 disposed within groove 34. Nozzle body 11 further defines an adaptor receiver housing 16. A locking lug retainer 60 is secured to nozzle body 11 as described above and a resilient bumper 171 is supported upon receiver housing 16. As is also described above, a cylindrical valve seat 110 is received upon interlock ring 80 and sealed thereto by a seal 132 received within a groove 131 of interlock ring 80. Valve seat 110 supports a valve seal 111 which receives poppet 202.

Poppet 202 is received upon a poppet head 203 and is thereby coupled to poppet shaft 103. Head 203 is formed as a castelated fitting similar to castelated fitting 183 shown in FIG. 12 and is secured in place using a pin 187 passing through an aperture formed in poppet shaft 103. An annular thrust bearing 204 preferably formed of nylon or similar material is interposed between head 203 and the interior of poppet 202 to provide a thrust bearing interface. In addition, a thrust bearing 207 is supported between bearing races 205 and 206 to rotationally support poppet 202 upon head 203. A snap ring keeper 208 is secured to poppet 202 in a manner captivating bearing race 206 to complete the attachment of poppet 202 to poppet shaft 103. The use of head 203 within poppet 202 together with thrust member 204 and thrust bearing 207 provides rotational movement of poppet head 202 with respect to poppet shaft 103.

FIG. 15 sets forth an enlarged partial section view of the attachment of head 203 to poppet 202 and shaft 103. Thus, poppet 202 receives poppet head 203 such that a nylon thrust member 204 is interposed between the upper surface of head 203 and the interior of poppet 202. Additionally, a pair of pair of bearing races 205 and 206 are positioned above and below a thrust bearing 207. The combination of bearing races 205 and 206 and thrust bearing 207 are secured within poppet 202 by a snap ring keeper 208. The latter is received within an appropriately positioned groove 210 formed within poppet 202. As described above, the essential function of poppet head 203 and the structure of poppet 202 which facilitates the use of thrust bearing 207 is to provide rotational motion between poppet 202 and poppet shaft 103 during the alignment insertion and rotation of the fueling adaptor as the fueling nozzle is secured to the aircraft.

What has been shown is a novel aircraft fueling nozzle which provides a lightweight, simple and easy to manufacture device utilizing a reduced number of operating parts. Despite its lower cost and lower complexity, the fueling nozzle described herein provides the necessary safety interlocks for preventing the opening of the fuel poppet valve without proper seating to an aircraft adaptor and preventing the removal of an engaged fueling nozzle from an aircraft adaptor without first closing the poppet valve.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in fueling an aircraft having a fueling adaptor defining a generally cylindrical wall, a fuel-receiving passage and a plurality of locking lugs, an aircraft fueling nozzle comprising:

a nozzle body defining a fuel passage therethrough, a hose coupler at one end and an engaging end and means for engaging said fueling adaptor;

a valve poppet supported upon said nozzle body movable between an open position and a closed position;

a valve seal supported within said fuel passage having a sealing surface for contacting said valve poppet in said closed position;

valve operating means for moving said valve poppet between said open and closed positions including a movable poppet link; and an interlock ring rotatably supported upon said nozzle body at said engaging end and having a plurality of interlock notches for receiving said locking lugs and a lock plate extending into said fuel passage, said interlock ring being rotatable between a first position preventing movement of said poppet link and a second position permitting movement of said poppet link while preventing rotation of said interlock ring to said first position until said valve poppet is in said closed position, said nozzle being secured to said fueling adaptor with said interlock ring in said first position and said valve poppet in said closed position by inserting said locking lugs of said fueling adaptor into said interlock notches of said interlock ring and rotating said nozzle body with respect to said fueling adaptor and said interlock ring so as to move said interlock ring to said second position.

2. An aircraft fueling nozzle as set forth in claim 1 wherein said means for engaging said fueling adaptor include:

a locking lug retainer defining a center aperture and a plurality of alignment notches spaced to receive said locking lugs; and attachment means for securing said locking lug retainer to said nozzle body overlying said interlock ring, said interlock notches being aligned with said alignment notches when said interlock ring is in said first position and out of alignment when said interlock ring is in said second position.

3. An aircraft fueling nozzle as set forth in claim 2 wherein said nozzle body defines a vertical channel within said fuel passage and wherein said poppet link defines an end portion received within said channel and wherein said lock plate spans said channel in said first position and is alongside it in said second position.

4. An aircraft fueling nozzle as set forth in claim 3 wherein said valve operating means includes:

a shaft rotatably supported by said nozzle body and having a first end extending into said fuel passage;

an eccentric coupling said first end to said poppet link such that rotation of said shaft raises and lowers said poppet link;

a poppet shaft having an upper end coupled to and supporting said valve poppet and a lower end pivotally coupled to said poppet link; and means slidably supporting said poppet shaft within said fuel passage.

5. An aircraft fueling nozzle as set forth in claim 4 wherein said interlock ring includes a cylindrical wall defining said interlock notches, a center wall and an annular space therebetween for receiving said generally cylindrical wall of said fueling adaptor.

6. An aircraft fueling nozzle as set forth in claim 5 further including a wave spring supported within said annular space.

7. An aircraft fueling nozzle as set forth in claim 6 wherein said valve seal includes:

a generally cylindrical valve seat received upon said center wall of said interlock ring; and a resilient annular sealing member, defining said sealing surface, supported upon said valve seat.

8. An aircraft fueling nozzle as set forth in claim 7 wherein said nozzle body defines a support surface for rotational support of said interlock ring and wherein said aircraft fueling nozzle further includes a thrust bearing interposed between said interlock ring and said support surface.

9. An aircraft fueling nozzle as set forth in claim 8 wherein said thrust bearing is a flat annular teflon member.

10. An aircraft fueling nozzle as set forth in claim 8 wherein said valve poppet defines a center recess and wherein said valve operating means includes a poppet head received within said center recess and secured to said upper end of said poppet shaft and a poppet bearing within said center recess for rotatably coupling said poppet head to said valve poppet.

11. An aircraft fueling nozzle as set forth in claim 10 wherein said valve seat defines an upper surface having a circular groove formed therein, said groove defining a generally cruciform cross-section and wherein said aircraft fueling nozzle includes a generally circular cross-section resilient O-ring seal compressively captivated within said groove and having a portion extending above said upper surface.

12. An aircraft fueling nozzle as set forth in claim 7 wherein said valve seat defines an upper surface having a circular groove formed therein, said groove defining a generally cruciform cross-section and wherein said aircraft fueling nozzle includes a generally circular cross-section resilient O-ring seal compressively captivated within said groove and having a portion extending above said upper surface.

13. An aircraft fueling nozzle as set forth in claim 1 wherein said interlock ring includes a cylindrical wall defining said interlock notches, a center wall and an annular space therebetween for receiving said generally cylindrical wall of said fueling adaptor.

14. An aircraft fueling nozzle as set forth in claim 13 further including a wave spring supported within said annular space.

15. An aircraft fueling nozzle as set forth in claim 1 wherein said valve seal includes:

a generally cylindrical valve seat received upon said center wall of said interlock ring; and a resilient annular sealing member, defining said sealing surface, supported upon said valve seat.

16. An aircraft fueling nozzle as set forth in claim 1 wherein said nozzle body defines a support surface for rotational support of said interlock ring and wherein said aircraft fueling nozzle further includes a thrust bearing interposed between said interlock ring and said support surface.

17. An aircraft fueling nozzle as set forth in claim 16 wherein said thrust bearing is a flat annular teflon member.

18. An aircraft fueling nozzle as set forth in claim 4 wherein said valve poppet defines a center recess and wherein said valve operating means includes a poppet head received within said center recess and secured to said upper end of said poppet shaft and a poppet bearing within said center recess for rotatably coupling said poppet head to said valve poppet.

19. For use in fueling an aircraft having a fueling adaptor defining a generally cylindrical wall, a fuel-receiving passage and a plurality of locking lugs, an aircraft fueling nozzle comprising:

a nozzle body defining a fuel passage and means for engaging said fueling adaptor by receiving said locking lugs;

a manually operative poppet valve for opening and closing said fuel passage;

valve operating means for opening and closing said poppet valve; and an interlock ring rotatably supported by said nozzle body and having a plurality of locking lug receiving notches and a lock plate, said interlock ring engaging said fueling adaptor when it is inserted into said nozzle body and rotating with said fueling adaptor with respect to said nozzle body between a first position in which said lock plate engages said valve operating means to secure said poppet valve in said closed position and a second position in which said lock plate prevents rotation of said nozzle body with respect to said fueling adaptor when said poppet valve is in said open position.

* * * * *